United States Patent [19]

Heiler, Jr.

[11] Patent Number: 4,739,229
[45] Date of Patent: Apr. 19, 1988

[54] APPARATUS FOR UTILIZING AN A.C. POWER SUPPLY TO BIDIRECTIONALLY DRIVE A D.C. MOTOR

[75] Inventor: Leo R. Heiler, Jr., Rochester, N.Y.

[73] Assignee: Eastman Kodak Company, Rochester, N.Y.

[21] Appl. No.: 98,578

[22] Filed: Sep. 18, 1987

[51] Int. Cl.$^4$ .............................................. H02P 1/22
[52] U.S. Cl. ...................................... 318/291; 318/256; 318/286; 318/293; 318/345 G
[58] Field of Search ............... 318/255, 256, 280, 286, 318/287, 288, 289, 291, 293, 345 C, 345 B, 345 G, 599, 756

[56] References Cited

U.S. PATENT DOCUMENTS

| | | | |
|---|---|---|---|
| 3,237,055 | 2/1966 | Riordan | 318/599 X |
| 3,444,448 | 5/1969 | Welch | 318/289 X |
| 3,560,825 | 2/1971 | Elliott | 318/293 X |
| 3,560,829 | 2/1971 | Brennan | 318/599 |
| 3,601,677 | 8/1971 | MacDavid | 318/345 C X |
| 3,604,996 | 9/1971 | Lutz | 318/345 C |
| 3,896,355 | 7/1975 | Guichteau | 318/256 X |
| 4,063,141 | 12/1977 | Levine | 318/648 |
| 4,319,171 | 3/1982 | Motoori | 318/379 |
| 4,459,531 | 7/1984 | Dumont et al. | 318/756 |
| 4,490,655 | 12/1984 | Feldman | 318/294 |
| 4,527,103 | 7/1985 | Kade | 318/293 |
| 4,544,869 | 10/1985 | Pittaway | 318/293 |

FOREIGN PATENT DOCUMENTS 1538071  6/1969  Fed. Rep. of Germany ...... 318/293

Primary Examiner—Bentsu Ro
Attorney, Agent, or Firm—Jeffrey L. Brandt

[57] ABSTRACT

Apparatus for using an a.c. power supply to bidirectionally drive a d.c. motor includes a first silicon controlled rectifier (SCR) having a cathode connected to a terminal of the motor and an anode connected to a circuit common junction. A second SCR has an anode connected to the motor terminal and a cathode connected to the common junction. An amplifier circuit including a PNP transistor connected in a common base configuration is connected between the gate of the first SCR and the common junction for selectively enabling or disabling the first SCR. Separate means are provided for selectively applying a signal to the amplifier circuit or to the gate of the second SCR for enabling the rotation of the motor in a first or second direction.

5 Claims, 2 Drawing Sheets

APPARATUS FOR UTILIZING AN A.C. POWER SUPPLY TO BIDIRECTIONALLY DRIVE A D.C. MOTOR

The present invention relates generally to motor control and more specifically to apparatus for using an alternating current (a.c.) power supply to bidirectionally drive a direct current (d.c.) motor.

BACKGROUND OF THE INVENTION

In many a.c. powered devices, it is desirable to bidirectionally control the rotation of a d.c. motor. One such example is a photgraphic slide projector, wherein a d.c. motor is used to focus a projection lens. In such a projector, the d.c. motor must be capable of rotation in either direction to properly focus the projection lens.

FIG. 1 shows a known circuit 10 for using an a.c. power supply 12 to bidirectionally control the rotation of a d.c. motor 14. Motor 14 comprises, for example, a conventional, permanent magnet type d.c. motor capable of rotation in one of two directions depending on the polarity of current applied thereto. Circuity 10 is utilized, for example, in a photographic slide projector (not shown) for focusing a projection lens (not shown) responsive to the operation of an infrared transmitter 16 by a human viewer (also not shown). Coded infrared information 18, output by transmitter 16, is received and decoded by an infrared receiver 20.

Infrared transmitter 16 and receiver 20 comprise standard components, the receiver including, for example, an IR sensor 22, preamp 24, decoder 26, and interface logic 28 connected generally seriatim. Logic circuit 28 typically comprises CMOS logic, wherein a logical low voltage is typically in the range of about 0 volts, and a logical high voltage is typically in the range of about 5-15 volts. Logic 28 could comprise, however, any type of two state, positive logic. The output of receiver 20 is used to control a motor controller circuit 30, so as to control the direction and amount of rotation of motor 14.

Continuing to describe FIG. 1, power supply 12 includes a source of a.c. power 32, for example 120 volt line voltage of the type typically used in the United States. A.c. source 32 is connected across a primary 34A of a transformer 34. A secondary 34B of transformer 34 is connected between a first terminal 36 of motor 14 and a circuit common junction 38.

Circuit 30 includes a first optically coupled, silicon controlled rectifier (SCR) circuit 40 including an SCR 41 having its cathode connected to a second terminal 42 of motor 14, and its anode connected to common junction 38. A light emitting diode (LED) 43 is positioed so as to be optically coupled to SCR 41 for selectively enabling the SCR, and is connected between an output A of receiver 20 and common junction 38. A resistor $R_1$ is connected in series with the anode of LED 43 for limiting the current flow therethrough, and a resistor $R_2$ is connected between the cathode and gate of SCR 41 for controlling the sensitivity of the gate.

A second optically coupled, silicon controlled rectifier circuit 44 includes a second SCR 45 connected in the reverse polarity between motor terminal 42 and common junction 38. A second LED 46 is positioned to be optically coupled with SCR 44, and is connected between an output B of receiver 20 and common junction 38. A resistor $R_3$ is connected in series with the anode of LED 46 for limiting current flow therethrough, and a resistor $R_4$ is connected between the gate and cathode of SCR 45 for adjusting the sensitivity to triggering of the SCR.

In operation, responsive to selectable codes emitted by transmitter 16, output A or B of receiver 20 is selectively driven to a high logic level, enabling the rotation of motor 14 in one of two directions. Examining this operation in greater detail, if output A is driven to a logic high, a current path is developed through resistor $R_1$ and LED 43 to common junction 38, activating the LED and enabling rectifier 41. Negative a.c. pulses appearing at secondary 34B of transformer 34 are then passed through rectifier 41, and operate to power motor 14 for rotation in a first direction. Since rectifier 45 is not enabled, positive a.c. pulses are blocked.

With output A held to a low logic level, and output B driven to a high logic level, current flows through resistor $R_3$ and LED 46, lighting the LED and enabling rectifier 45. In this mode of operation, positive a.c. pulses developed at transformer secondary 34B are passed by rectifier 45, with the negative pulses being blocked by rectifier 41. Under these circumstances, motor 14 is powered to rotate in the opposite direction. Motor 14 is thus bidirectionally controlled using the power supplied by a.c. power supply 12. It is, of course, undesirable to drive both outputs A and B simultaneously to a high logic level, and the operation of transmitter 18 and receiver 20 is designed to prevent such an occurence.

The above described circuit, while operating adequately to drive motor 14, presents the disadvantage of relatively expensive. More particularly, optocoupled rectifiers 40 and 44 are expensive devices, particularly when used in a mass production device.

SUMMARY OF THE INVENTION

It is therefore a principal object of the present invention to provide apparatus for bidirectionally controlling the rotation of a d.c. motor with an a.c. power supply, which is relatively inexpensive, straightforward in construction, and readily adaptable to mass production.

In accordance with the present invention, the optocoupled, silicon controlled rectifiers circuits, described above, are replaced with substantially less expensive components. More specifically, the current invention comprises apparatus for utilizing an a.c. power supply to bidirectionally drive a d.c. motor, the a.c. power supply connected to a first terminal of the d.c. motor. A first silicon controlled rectifier is provided having an cathode connected to a second terminal of the d.c. motor and an anode connected to a circuit common junction. A second silicon controlled rectifier is provided having an anode connected to the second motor terminal and a cathode connected to the circuit common junction. Gate control means are provided, including a transistor amplifier connected in a common base configuration, electrically connected between the gate of the first silicon controlled rectifier and the circuit common junction for selectively enabling or disabling said first silicon controlled rectifier. First means are provided for selectively applying a signal to the gate control means so as to enable the first silicon controlled rectifier, whereby to power the rotation of said d.c. motor in a first direction. Second means are provided for selectively applying a signal to the gate of the second silicon controlled rectifier so as to enable the second silicon controlled rectifier, whereby to power the rotation of said d.c. motor in an opposite direction.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

BEST MODE FOR CARRYING OUT THE INVENTION

Figure 1:
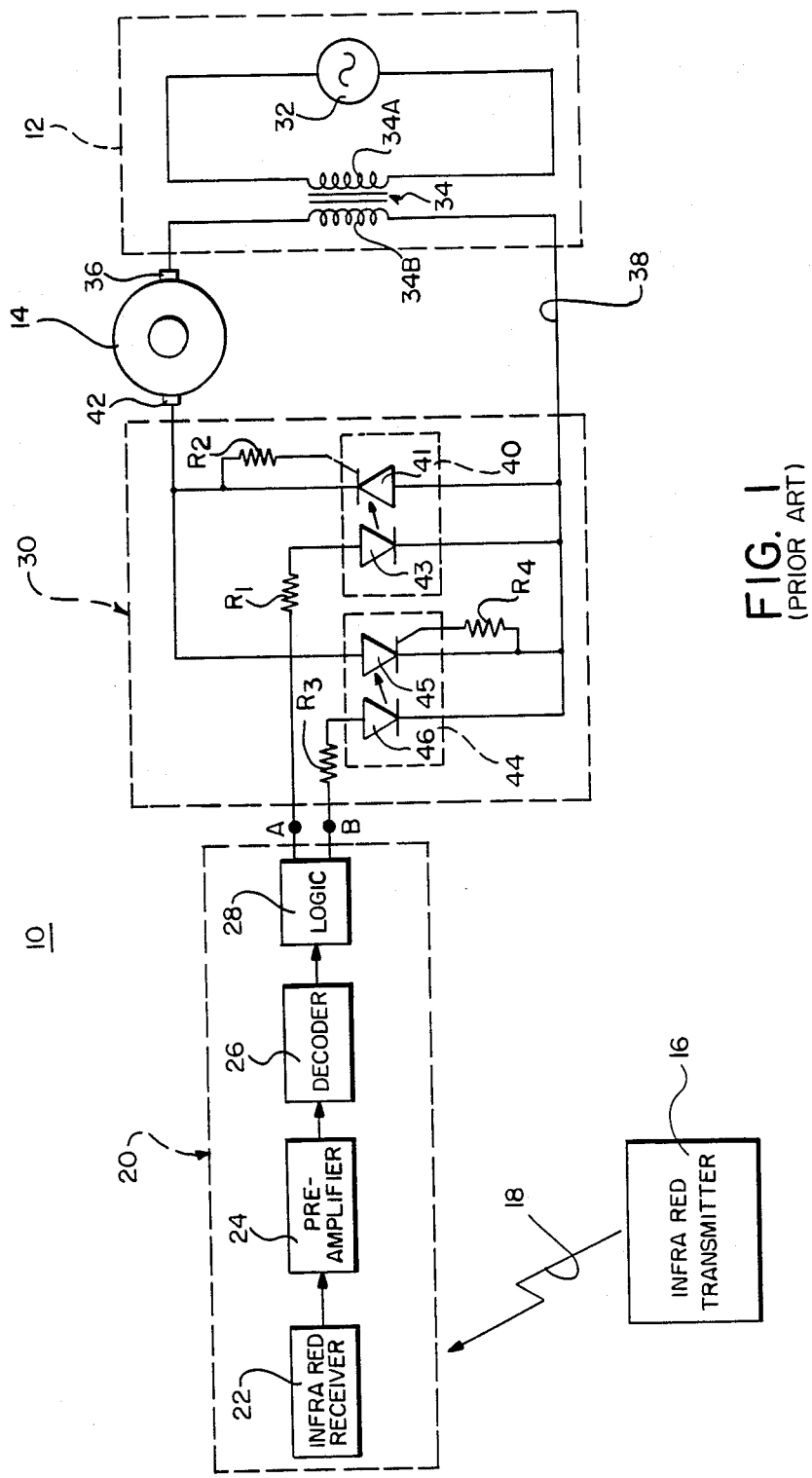
FIG. 1 is a schematic drawing of a motor control circuit constructed in accordance with the prior art, as described in detail hereinabove.
Figure 2:
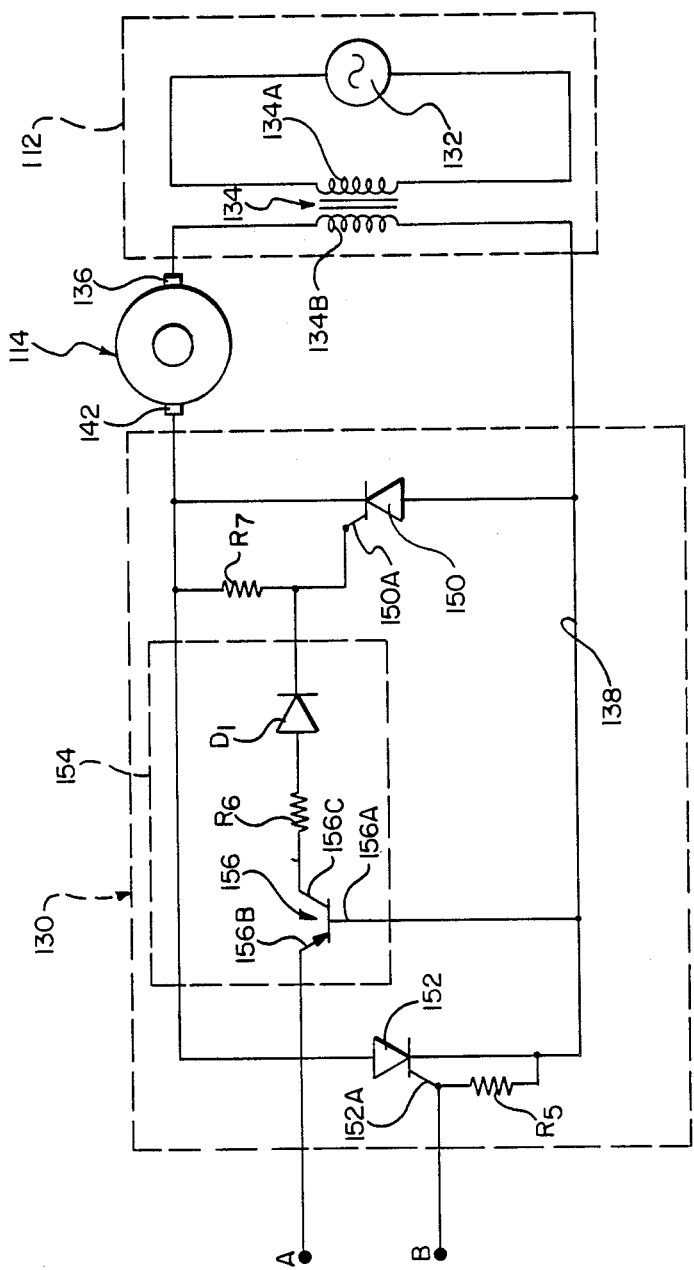
FIG. 2 is a schematic drawing of a motor control circuit constructed in accordance with the present invention.

Referring now to FIG. 2, a motor control circuit 130 is shown in schematic diagram. Elements identical to those described in FIG. 1 above are indicated by like reference numerals incremented by 100.

As will be apparent from a consideration of both FIGS. 1 and 2, optocoupled, silicon controlled rectifier circuits 40, 44 (FIG. 1) are replaced with conventional silicon controlled rectifiers 150, 152, respectively. The gate of rectifier 152, indicated at 152A, is electrically connected directly to output B of receiver 20 (not shown in FIG. 2). A sensitivity-adjusting resistor $R_5$ is connected between the gate and cathode of SCR 152. The gate of rectifier 150, indicated at 150A is connected to output A of receiver 20 via an intermediate amplifier circuit 154. In a manner described in greater detail below, output B of receiver 20 directly controls gate 152A of rectifier 152, while receiver output A controls gate 150A via amplifier circuit 154.

Referring now to amplifier circuit 154, a transistor 156 is connected in a common base amplifier configuration with base 156A connected to common junction 138. The transistor emitter, indicated by 156B, is electrically connected directly to input A. The transistor collector, indicated at 156C, is connected to motor terminal 142 through a biasing resistor $R_6$, a diode $D_1$, and a sensitivity-adjusting resistor $R_7$, the latter three components being connected seriatim. Gate 150A of rectifier 150 is connected at the junction of the cathode of diode $D_1$ and resistor $R_7$, so that the resistor is connected between the SCR gate and cathode. SCR's 150, 152 comprise, for example, Motorola MCR-22's.

The operation of motor driver circuit 130 will be considered first with receiver output A at a logical low voltage, and output B at a logical high voltage. With output A low, transistor 156 is in the OFF state, no current flows to gate 150A, and rectifier 150 does not conduct current (i.e. it blocks positive a.c. pulses, and is not enabled to pass negative a.c. pulses). Diode $D_1$ blocks positive current flow through amplifier circuit 154. With output B high, rectifier 152 will conduct negative a.c. pulses, powering motor 114 to run in a first direction.

Examining now the reverse state of operation, with output A high and output B low, rectifier 152 does not conduct any current. Transistor 156 conducts, and a current is conducted into gate 150A. Rectifier 150 is thus enabled to conduct negative a.c. pulses, thereby powering motor 114 to rotate in an opposite direction. Rectifier 150 and diode $D_1$ will, of course, continue to block positive a.c. pulses.

For purposes of explanation, it is noted that if gate 150A of rectifier 150 were connected directly to input A, because a logic low at input A represents a positive voltage relative to common junction 138, the rectifier would conduct every negative a.c. pulse.

There is thus provided apparatus for using an a.c. power supply to bidirectionally control a d.c. motor. The apparatus is relatively and substantially less expensive than that used in the prior art. It comprises standardly available components and is readily adapted to mass production. It is particularly compatible with the types of logic circuitry typically employed in a.c. powered apparatus. The invention has application, for example, in photographic slide projectors, and other types of a.c. powered apparatus employing bidirectionally controllable d.c. motors.

While a preferred embodiment of the invention has been illustrated and described, it will be clear that the invention is not so limited. Numerous modifications, changes, variations, substitutions and equivalents will occur to those skilled in the art without departing from the spirit and scope of the present invention.

What is claimed is:

1. Apparatus for utilizing an a.c. power supply to bidirectionally drive a d.c. motor, said a.c. power supply connected to a first terminal of said d.c. motor, said apparatus comprising:
   a first silicon controlled rectifier having a cathode connected to a second terminal of said d.c. motor and anode connected to a circuit common junction;
   a second silicon controlled rectifier having an anode connected to said second motor terminal and a cathode connected to said circuit common junction;
   gate control means, including a transistor amplifier connected in a common base configuration, electrically between the gate of said first silicon controlled rectifier and said circuit common junction for selectively enabling or disabling said first silicon controlled rectifier;
   first means for selectively applying a signal to said gate control means so as to enable said first silicon controlled rectifier, whereby to power the rotation of said d.c. motor in a first direction; and
   second means for selectively applying a signal to the gate of said second silicon controlled rectifier so as to enable said silicon controlled rectifier, whereby to power the rotation of said d.c. motor in a second direction.

2. Apparatus in accordance with claim 1 wherein said transistor amplifier comprises:
   a PNP transistor including;
   a base connected to said circuit common junction,
   an emitter connected to said first means
   a collector connected to the gate of said first silicon controlled rectifier through a biasing resistor.

3. Apparatus in accordance with claim 2 wherein said transistor amplifier further comprises a diode connected between said biasing resistor and the gate of said first silicon controlled rectifier.

4. Apparatus in accordance with claim 1 wherein said a.c. power supply comprises:
   a source of a.c. power; and
   a transformer having a primary connected across said source of a.c. power and a secondary connected between said first terminal of said d.c. motor and said circuit common junction.

5. Apparatus in accordance with claim 1 wherein said first and second means for applying signals includes means for receiving and decoding a coded infrared signal containing information indicative of the desired direction of rotation for said d.c. motor.

* * * * *